United States Patent [19]

Lundquist et al.

[11] 4,005,435

[45] Jan. 25, 1977

[54] LIQUID JET DROPLET GENERATOR

[75] Inventors: David E. Lundquist, Birmingham, Mich.; Paul R. Hoffman, Exton, Pa.; Chauchang Su, W. Bloomfield Township, Mich.; Benjamin T. Sung, Southfield, Mich.; Steven A. Eichhardt, Bloomfield Township, Mich.

[73] Assignee: Burroughs Corporation, Detroit, Mich.

[22] Filed: May 15, 1975

[21] Appl. No.: 577,667

[52] U.S. Cl. .................................... 346/1; 346/75; 259/2

[51] Int. Cl.² .................. G01D 9/00; G01D 15/18; B01F 15/00

[58] Field of Search ...... 346/75, 1; 259/2, DIG. 41, 259/DIG. 44; 310/8.7; 239/102

[56] References Cited

UNITED STATES PATENTS

| | | | |
|---|---|---|---|
| 2,512,743 | 6/1950 | Hansell | 346/76 UX |
| 3,140,859 | 7/1964 | Scarpa | 310/8.7 X |
| 3,578,996 | 5/1971 | Balamuth | 310/8.7 |
| 3,683,396 | 8/1972 | Keur et al. | 346/75 X |
| 3,769,630 | 10/1973 | Hill et al. | 346/75 |
| 3,866,237 | 2/1975 | Meier | 346/75 |
| 3,885,172 | 5/1975 | Miller | 310/8.7 |
| 3,900,162 | 8/1975 | Titus et al. | 346/75 X |
| 3,928,855 | 12/1975 | Helinski et al. | 346/75 X |

*Primary Examiner*—George H. Miller, Jr.
*Attorney, Agent, or Firm*—Ralzemond B. Parker; Edwin W. Uren; Carl Fissell, Jr.

[57] ABSTRACT

A generator for producing droplets of liquid by subjecting a confined body of such liquid to varying pressures at a given frequency and causing such liquid to issue from a discharge orifice first as a continuous stream and thereafter to break up into a succession of separate droplets. A particular use of the generator is to produce a controlled stream of ink droplets for the purpose of forming printed characters on documents. It accomplishes this object by making use of acoustic and ultransonic vibrations in a body of ink contained in a cavity of tapering dimensions having an ink intake passage and a discharge orifice, and causing periodic variations (or varicosities) in the hydraulic pressure at the discharge orifice which in turn causes the issuing stream of ink to break up into uniformly spaced apart fine droplets of ink. The droplet forming generator includes a resonant vibrating system composed of tapered front and rear horns having their wider ends in surface contact with the opposite sides of a crystal transducer sandwiched therebetween. The ink at the wider end of the cavity receives the pressure oscillations from the front horn and such pressures are concentrated by the shape of the cavity into the immediate region of its discharge orifice. The entire acoustic droplet generator is designed to locate the standing waves of pressure where they are most effective in the operation of the resonant system. Consequently, the generator can use liquids of higher viscosity at greater pressures and at higher frequencies of droplet formation than heretofore achieved. The advantages of thicker viscosity inks and higher pressures enables the attainment of better print quality and greater printing rates.

16 Claims, 8 Drawing Figures

FIG. 2.
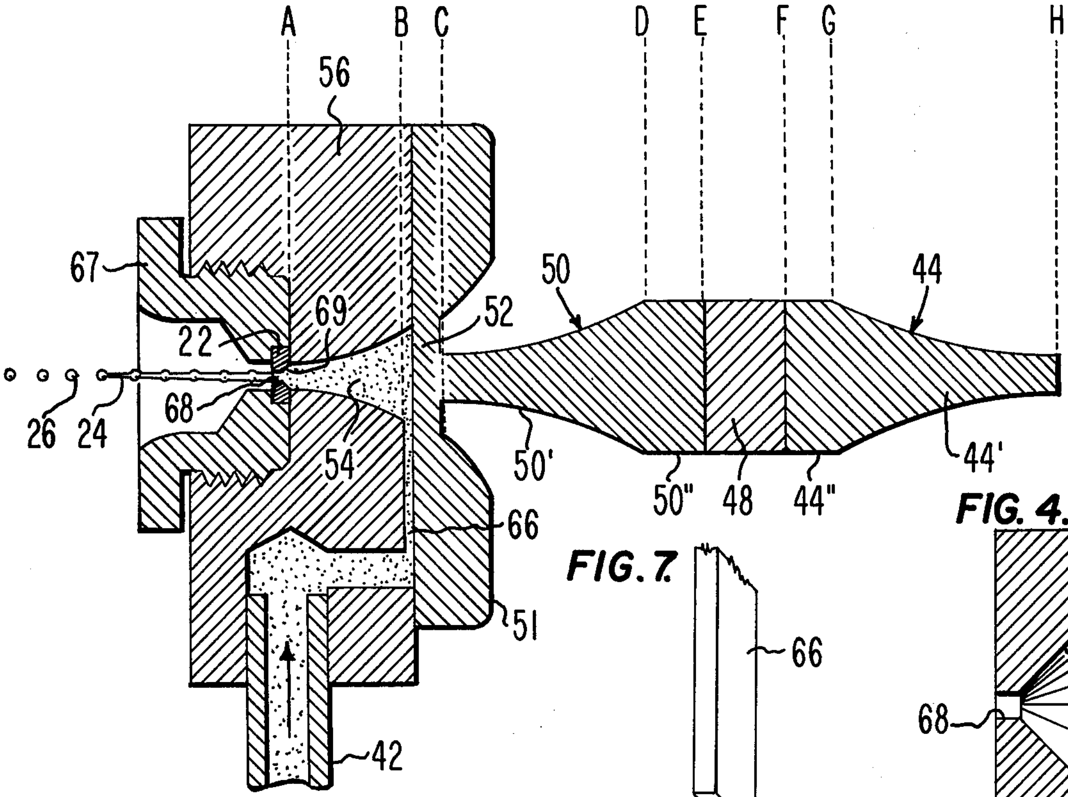
FIG. 7.
FIG. 4.
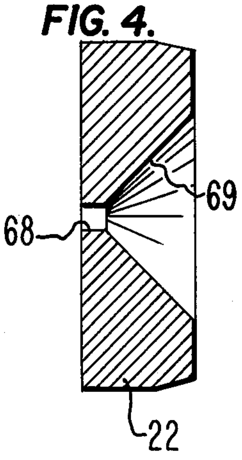
FIG. 3.
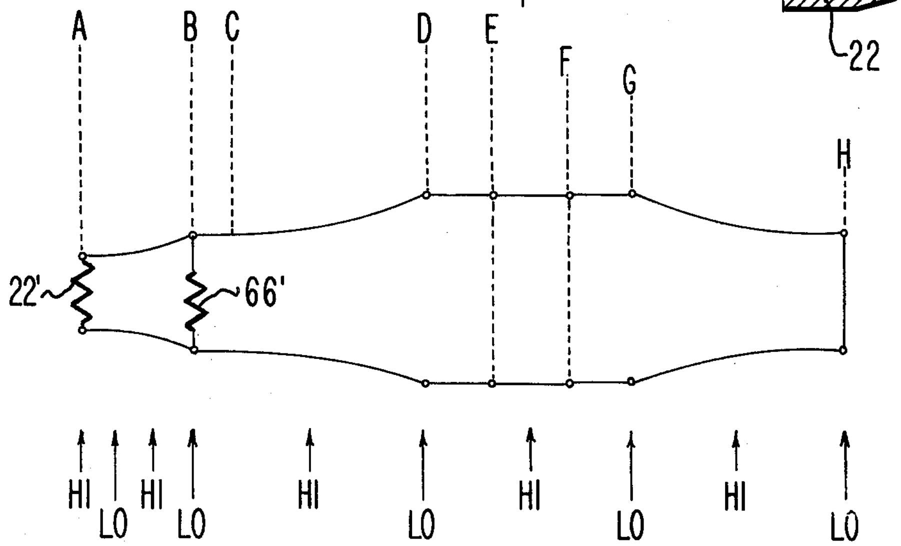
LOCATIONS OF MAXIMA AND MINIMA OF IMPEDANCE

LIQUID JET DROPLET GENERATOR

BACKGROUND OF THE INVENTION

This invention relates to liquid jet droplet generators and more particularly to a generator component of this character for use in non-impact printing systems employing directed ink droplets.

Although the field of ink jet droplet printing is to be commended for its advancements, still the printing speeds and print quality achieved to date fall far short of matching the operating speeds of computer elements and particularly the output information capable of being provided by computers for producing printed records. The prior art has accomplished droplet formation by causing the nozzle to be vibrated but this required a delicate vibrating structure to form the droplets. Other workers in this art have employed supersonic compressional waves in tapered liquid or solid bodies as witnessed by the comparatively early U.S. Patent to Hansell No. 2,512,743. Further developments of this character are disclosed in the U.S. Patents to Naiman No. 3,211,088 and Stemme No. 3,747,120. Although these patents disclose certain features which are common to the present invention, their respective constructions and assemblies are such that they are unable to operate at the higher frequencies and hydrostatic pressures desired for high speed association with electronic data processing equipment.

SUMMARY OF THE INVENTION

Accordingly, it is an important object of the invention to provide an improved liquid jet droplet generator which is capable of operating at high frequencies and at high hydrostatic pressures.

Another important object of the invention is to provide such a droplet generator which is capable of handling liquids of substantially greater viscosities.

Another important object of the invention is to provide an improved liquid droplet generator for use in high speed jet printers which enables the attainment of high printing quality whether at the same droplet formation rate of the prior art or at droplet formation frequencies substantially greater than heretofore achieved.

A further important object of the invention is to provide an improved ink jet droplet generator which uses substantially higher viscosity inks, employs substantially higher hydrostatic pressures and operates at substantially greater frequencies.

A further important object of the invention is to provide a highly efficient resonant vibrating system for creating and transmitting pressure variations to the immediate vicinity of the jet stream discharge orifice.

A further important object of the invention is to provide an improved acoustically operated liquid jet droplet generator which is designed in a novel manner to develop and make effective usage of acoustic energy.

In carrying out these and other objects, the present invention contemplates a liquid jet droplet generator particularly adapted for non-impact printing systems, but not necessarily limited thereto, which employs directed ink droplets for deposit upon record members. The generator includes a generally conically shaped but preferably exponentially tapered liquid containing cavity within a suitable body, the cavity opening out at its apex end to form a jet stream discharge orifice and provided adjacent to its wider end with a passage through the body serving as an inlet for the supply of liquid, such as ink, thereto. A resonant vibrating component preferably formed of two similarly exponentially tapered solid horns are aligned on a common axis and have their wider ends in surface contact with the opposite sides of a piezoelectric type member capable of converting pulsating electrical voltages into ultrasonic mechanical pressure vibrations. This component is mounted so that the apex end of the front horn abuts a tuned diaphragm closing the wider end of the cavity thereby setting up pressure waves in the cavity which are concentrated at the discharge orifice to cause the jet stream to break up into regularly spaced droplets a short distance from the orifice.

Various features of the invention include a resonant vibratory system which is modeled mathematically in analogy to electric transmission line equations for transmitting pressure variations from a piezoelectric type vibrating element to the immediate vicinity of the capillary size discharge nozzle. In addition, the resonant vibrating system is so structured that it establishes standing waves of alternating maximum and minimum pressures throughout the system, but especially in the fluid filled cavity where in the operation of the system a standing wave of maximum pressure is located at the discharge nozzle and a standing wave of minimum pressure is located at the ink supply inlet into the cavity. This inlet is further designed so that its largest dimension which is represented by its length in the in-flow direction lies in a plane coinciding with a standing wave of small or minimum amplitude for inhibiting the escape of vibrating energy from the cavity.

BRIEF DESCRIPTION OF THE DRAWING SHEETS

Various other objects, advantages and meritorious features of the invention will become more fully apparent from the following specification, appended claims and accompanying drawing sheets wherein:

FIG. 2 is an enlarged longitudinal cross sectional view through the acoustic droplet generator of FIG. 1 and showing in greater dimensional detail the shape and connections of the parts to one another;

FIG. 3 is an explanatory electrical analogy of the droplet generator illustrated in FIG. 2;

FIG. 4 is an enlarged view of the jet stream discharge nozzle employed in the generator of FIG. 2;

FIG. 7 illustrates a preferred shape of the inlet passage.

DESCRIPTION OF A PREFERRED EMBODIMENT OF THE INVENTION

Figure 1:
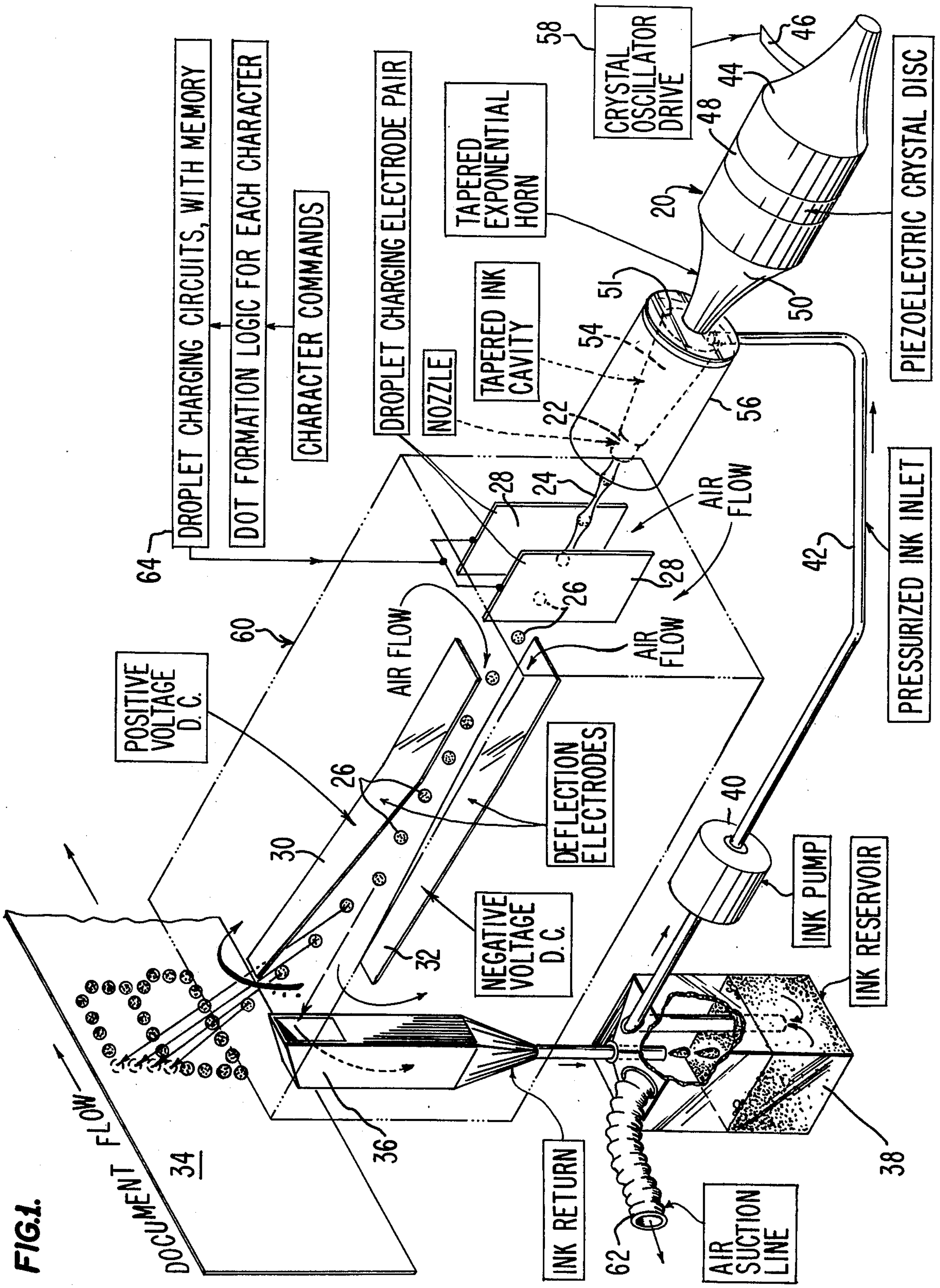
FIG. 1 is a schematic representation of an ink jet droplet printing system including an acoustic droplet generator embodying the invention.

FIG. 1 is a schematic representation of a preferred embodiment of the invention. Briefly, the system includes an ink droplet generating and control assembly employing an improved acoustic or ultrasonic vibrator component generally indicated at 20 which causes periodic vibrations in the pressure of the ink at the location of the nozzle 22. This in turn causes modulations in the velocity at which the ink is ejected from the nozzle, thus breaking up the stream of ink 24 into uniformly spaced apart fine droplets of ink 26. The breaking up of the ink stream 24 into droplets is controlled to occur at a uniform distance from the nozzle 22 and at this location an electrostatic charging device is provided which is herein shown in the form of a pair of charging electrodes or plates 28—28 extending in parallel relation to one another on opposite sides of the "break-off" point of the droplet stream. Depending upon the use of each ink droplet, it will be either charged varying amounts by the charging plates 28—28 or left uncharged.

The ink droplets 26 initially follow one behind the other into the entrance end of a spaced apart conjugate pair of elongated droplet deflection electrodes 30 and 32 which extend in the general direction of travel of the droplets and terminate close to the recording surface upon which the charged droplets impinge. In order to form readable characters on documents and the like, relative movement is provided between the document and the ink droplet generating and control assembly. In the illustrated system the documents 34 are supported for translatable movement in one direction across the projected stream of ink droplets 26 such as shown at the left of FIG. 1. Opposite voltage polarities are applied to the deflection plates 30 and 32 from suitable direct current sources which establish the existence of an electrical field or potential difference between these two electrodes which is maintained relatively constant. One such electrode 30 may be positively charged and the other 32 negatively charged as shown in FIG. 1. In the schematic illustration of FIG. 1, the only droplets in the stream which bear charges are charged negatively by the plate electrodes 28—28. As a result the charged droplets are angularly deflected upwardly toward the positive electrode 30 an amount proportional to the magnitude of the negative electric charge carried by each charged droplet. The direction of the electric deflection force is upwards in the schematic view of FIG. 1. The motion of the document or other indicia media is to the right as shown by the arrows associated with the document 34 in FIG. 1.

The uncharged ink droplets, which are unaffected by the deflection controlling electrodes 30 and 32, are delivered along a straight path and are therefore caught by an ink droplet catcher 36 and delivered to an ink supply reservoir 38. Ink in the reservoir is fed under pressure into the system, and for such purpose the inlet of a pump 40 is immersed into the ink supply in the reservoir and the outlet of the pump forms a pressurized ink inlet tube 42 to an ink cavity 54 interposed between the ultrasonic vibrator 20 and the ink jet nozzle 22.

The droplet charging and droplet break away processes are very closely interconnected. The droplets shown in FIGS. 5A and 5B have the following history. As the ink jet stream 24 moves forward, the neck of liquid connecting each adjacent pair of embryo droplets becomes successively smaller. When each neck reaches the point of break away, it has shrunk to a diameter typically several ten-thousandths of an inch. As each droplet passes the point of break away, its connecting neck of liquid to the jet stream finally breaks and separates its leading droplet from the one behind it.

Figure 5A:
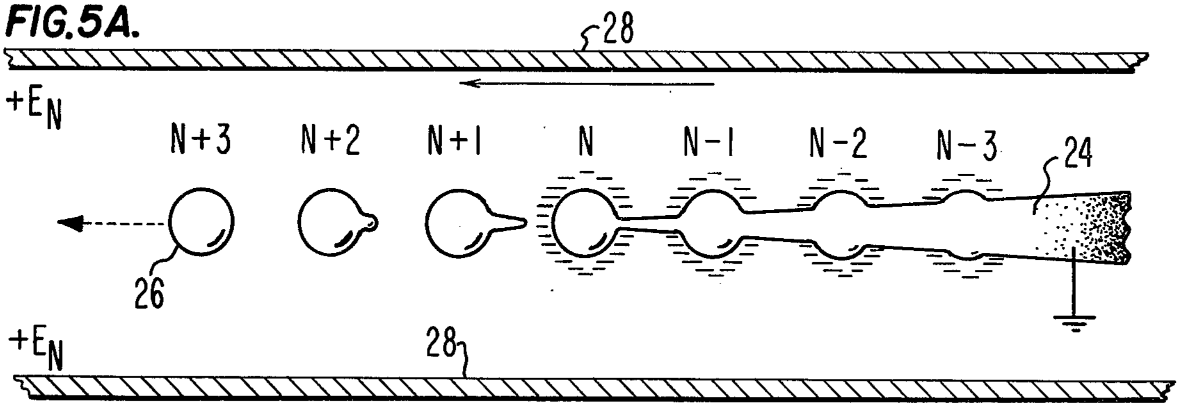
FIGS. 5A and 5B are greatly enlarged views of the break-up of the jet stream into successively formed droplets and schematically illustrating the electrical charging of the droplets as they are formed.

At the instant of separation, if droplet N+1 in FIG. 5A has no electrical charge on it, it will carry no charge after it has separated from the droplet stream. Thus, in FIG. 5A, at the times of break away of the earlier formed droplets N+3, N+2, and N+1, the voltage E on the charging plates 28—28 was zero. FIG. 5A shows droplet N just before break away takes place at a time when a positive voltage of value $E_N$ has been applied to the electrode charging plates 28—28 on either side of the droplet stream just after the preceding uncharged droplet N+1 has broken away. The resulting distribution of negative electric charge on the jet stream is shown schematically in FIG. 5A. It should be noted that under such circumstance all droplets which have not yet broken free from the stream 24 have the same sign of electric charge upon them.

Figure 5B:
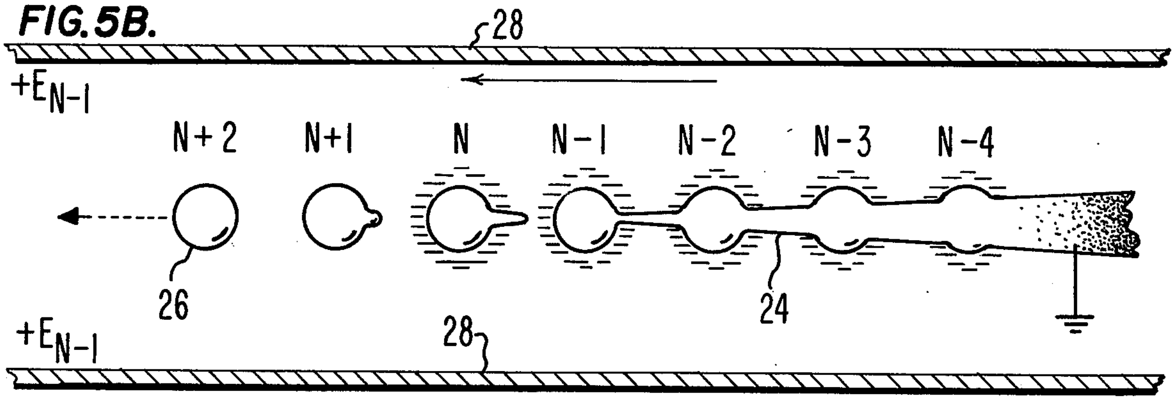

The situation at one droplet period later in time is shown in FIG. 5B. Droplet N has moved forward to the position previously occupied by droplet N+1 and carries a negative charge. Droplet N−1 has now moved forward to the break away position. If the voltage on the electrodes remains the same as when droplet N was in the break away position, the electric charge appearing on droplet N−1 after break away will be less than the charge on droplet N. Past workers in the art have realized the occurrence of this loss in charge as between two consecutively formed droplets. It has been the practice in the art to interpose an uncharged droplet between every adjacent pair of charged droplets, thereby providing an electrostatic shield between the charged droplets to minimize this interaction as recited on page 2-2 of the publication of A. B. Dick Company, copyright 1971, entitled "VIDEOJET, M9600 Printer, Technical Description". This past practice of providing shielding droplets is avoided in the herein illustrated system which provides an electronic correction for such reduction in charges as hereinafter described.

Returning to FIG. 1, the illustrated embodiment of the invention is designed to vibrate at one desired operating frequency, such as 300 kilohertz, and employs several resonant sections: (1) a rear solid metallic horn 44 which in the illustrated embodiment is set to vibrate at the desired frequency and which also serves as an electrical conductor for delivering current from a terminal 46 to an abuttable vibratory transducer 48, (2) the vibratory transducer 48 is preferably a piezoelectric crystal disc for converting the electric pulses into ultrasonic pressure vibrations, and (3) a tapered solid exponential front horn 50 of supersonic wave transmitting material has its apex end terminating in a plate or wall 52 for transmitting the pressure vibrations into the liquid ink content of a tapered or conically-shaped cavity 54 formed in a body 56. The plate 51 also functions to close the larger end of the cavity 54. The ejection ink nozzle 22 at the smaller end of the cavity 54 is preferably a firm, rigid, virtually indestructable mounting of a jeweled sapphire shaped for this purpose. The driver circuit indicated by block 58 for the crystal transducer generates plus going pulses whose spacing is equal to the operating frequency of the droplet generator. As hereinafter described, the driver circuit 58 also contains a series connected resonant circuit which generates large sinusoidal voltages and applies the same through the terminal 46 to the rear horn 44 of the vibrator for driving the piezoelectric transducer.

With the increased speed of the droplet printing system of the present invention, each droplet in addition to experiencing a deflection force dependent upon its electric charge, also experiences an air drag force dependent upon the size and velocity of the droplet through the atmospheric air. The improved laminar air flow feature of the illustrated system minimizes the problem created by the "air drag" force encountered by the droplets. The illustrated system operates in the 300 kilohertz region, but the effect of air drag force on each droplet is increased geometrically to about six or seven times greater than that encountered by the droplet in the 100 kilohertz range. By creating a laminar flow of air collinearly with the droplet stream, the air drag force is reduced to an acceptable magnitude. The laminar air flow also reduces the "wake" of the disturbed air created by each droplet and encountered by the next succeeding droplet.

As schematically shown in FIG. 1, the laminar air flow is accomplished by inducing air to flow through the droplet deflection assembly generally indicated at 60 collinearly with the initial direction of the droplet stream 26 and preferably at a rate of speed approximating half of that of the ink droplets. This air flow is then preferably suctioned through the droplet deflection assembly 30–32 by providing one or more inlet openings surrounding the ink droplet generator assembly through which atmospheric air is induced to enter and then induced to flow through a reduced air-tight passage in the droplet deflection assembly which closely surrounds the droplet stream and the deflection electrodes 30 and 32. An air suction line 62 leading from a source of low air pressure is connected to the upper portion of the ink reservoir 38 which is sealed off from the atmosphere such as in the manner illustrated in FIG. 1 and serves to create the desired subatmospheric pressure therein for inducing air to flow through the passage in the deflection assembly and to enter the catcher 36 along with the unused ink droplets. The high rate of the air flow thus created also serves to scavenge the walls of the ink return path to the reservoir. This feature is disclosed and claimed in the copending application for patent in the names of David E. Lundquist, Arvin D. McGregor and Paul R. Hoffman, Ser. No. 625,811, filed Oct. 24, 1975, entitled Air Turbulence Control of Inflight Ink Droplets in Non-Impact Recorders, now U.S. Pat. No. 3,972,051, granted July 27, 1976, and of common ownership herewith.

Another feature of the herein illustrated and described system is the provision of an electrical charge correction circuit for the purpose of making use of each droplet in sequence during the printing of characters rather than using only alternate droplets for printing as practiced in the prior art. In developing the system to which this invention relates, it was found that the electrostatic charge applied to each ink droplet as it is formed would affect the charge carried by the successive droplet. To overcome this, past workers in the art suggested charging only every other droplet in order to make each interposing uncharged droplet serve as an electric shield between the adjacent charged droplets. The uncharged droplets would then be discarded or recirculated after they have served this shielding function, whereas in a system embodying the change correction circuit feature, those droplets selected for printing can be sequentially charged in close array and used for printing characters without requiring the interposition of a shield droplet between each adjacent pair of charged droplets. This is accomplished by the use of a memory in the droplet charging circuits represented in FIG. 1 by the block 64 which examines the train of electric pulses from the character generator and retains in its memory the command given to the previous droplet. This feature substantially improves the speed and efficiency of the system.

The herein illustrated and described ink jet droplet generator makes use of acoustic or ultrasonic vibrations in the body of ink contained in a cavity and from which the ink escapes through a nozzle 22 having a small discharge orifice, such as 0.002 inch. These vibrations cause periodic variations in the hydraulic pressure at the location of the nozzle. The pressure variations cause modulation of the velocity at which the ink is ejected from the nozzle. These velocity variations cause the stream of liquid to break into uniformly spaced fine droplets at a point beyond the nozzle. As earlier mentioned herein, the technique employs a rigid, virtually indestructable mounting of a jeweled sapphire in the nozzle 22 having an orifice therein through which the ink jet stream 24 is discharged. The nozzle can be removed for cleaning or replacement easily. In the illustrated embodiment, the vibratory elements and the nozzle are separated from one another and each assembly can be changed, repaired, or replaced independently of the other.

Prior techniques utilized relatively low pressures to force low viscosity liquid inks through the nozzle. Such early techniques made use of liquid inks of typical viscosity of 2 to 10 centipose and hydrostatic pressures of up to 85 lb/in$^2$. The present described technique makes use of liquids of viscosity up to 45 centipose and greater, and can use hydrostatic pressures up to 400 lbs/in$^2$. The advantage of such a choice of higher viscosity inks and higher pressures lies in the attainment of higher printing quality at the same droplet rate as in the prior art. Moreover, the use of higher pressures allows operation at frequencies substantially greater than that of the prior art.

The ink droplet generator of FIG. 1 is shown in considerably larger scale and greater dimensional detail in FIG. 2 hereof. Referring more particularly to FIG. 2, the generator comprises the following parts, whose respective functions are as follows:

1. The rear horn 44 has a tapered resonant vibrating section 44' preferably operating at 300 kilohertz and a cylindrical section 44'' abutting the crystal transducer 48. The rear horn is a solid mass of electrically conductive material and carries the electric current to the abutting surface of the crystal transducer. The crystal therefore should be electrically insulated from grounded parts.
2. The crystal transducer 48 converts electrical power into ultrasonic pressure vibrations in the horns. It is bonded on one side to the cylindrical section of the rear horn 44 and on the opposite to the cylindrical section 50'' of the front horn 50. This transducer, together with the cylindrical sections 44'' and 50'' of the two horns, form a second resonant section also similarly operating at the preferred rate of 300 kilohertz.
3. The front horn 50 has its tapered section 50' integrally connected to a stub section constituted by a thicker annularly shaped section 51 and a thinner central diaphragm section 52. The tapered section 50' forms a third resonant section of the droplet generator also operating at the desired 300 kilohertz frequency. The smaller or apex end of the tapered horn section 50' is shown joined integrally to the central portion of the vibrating wall or diaphragm 52 which forms the fourth resonant section of the generator operating at the same frequency and which transmits the pressure vibrations into the liquid ink contained inside the cavity 54.

4. The specially formed conically tapered cavity 54 in the cavity block 56 is designed to transmit and concentrate the pressure oscillations in its ink content toward and into the immediate region of the nozzle 22.
5. The ink inlet passage into the droplet generator cavity 54 is shown at 66 in FIG. 2 and is formed as a specially calculated cutaway portion of a thin seal (not shown) located between the vibrating diaphragm 52 and the adjacent end wall of the cavity block 56. As later pointed out herein, the inlet passage 66 is so located as to prevent the escape of vibrating pressures from the cavity.
6. As shown in detail in FIG. 2, the nozzle 22 is secured in place by a holder 67, which is threadedly mounted in the forward end of the block 56 and provides an easily removable mounting for the nozzle. The orifice 68 of the nozzle converts the modulated pressure of the ink in the cavity 54 into the kinetic energy of motion of the ink jet stream 24.
7. The modulated jet ink stream 24 breaks into the tiny droplets 26 beyond the unthreaded end of the holder 67 but at a fraction of an inch distant from the nozzle's orifice.
8. The outlet end of the ink supply tube 42 is fitted into the block 56 and communicates with the ink inlet passage 66 in the manner illustrated in FIG. 2.

The entire acoustic droplet generator system may be modeled mathematically in analogy to the electric transmission line equations which are well known in electrical engineering. FIG. 3 shows the equivalent circuit for this entire system in comparative relation to the mechanical parts of the droplet generator of FIG. 2. In the electrical analogy, the total force at a given cross-section is analogous to the voltage appearing on the transmission line at that point. In FIG. 3, the nozzle 22 is represented by an electrical resistance 22' and the ink inlet 66 by another such resistance 66'. Since the illustrated design is a valveless ink metering system, it is desirable to arrange a standing wave pattern for the vibratory system such that the standing wave at the nozzle is of large amplitude so as to provide the most efficient break away of the droplets. On the other hand, the standing wave at the ink inlet is of small amplitude so as not to allow the energy of vibration to escape from the cavity 54 by way of the inlet passage.

The liquid in the exponential cavity 54 is directly connected to the exponential horn 50. In a rough approximation, the diaphgram 52 is a one to one ratio impedance transformer for the transmission of impulses from the small end of the tapered horn 50' into the liquid cavity 54. Such a system, as shown in FIG. 3, is a resonant system.

The entire system as shown can be analyzed to solve for the locations of high and low voltages on the system, and to show how these antinodes and nodes move or change with frequency changes. The arrows and associated legends at the bottom of FIG. 3 show the intended locations of these voltages or impedance maxima and minima. These maxima and minima, respectively identified as "HI" for pressure antinodes and "LO" for pressure nodes in FIG. 3, can be approximately located without resorting to the exact solution to the impedance transfer equations. The design intent for the illustrated acoustic droplet generator system is as follows:

A. The nozzle is located at a maximum of impedance in order to have large pressure variations at the nozzle.
B. The ink inlet 66 is located at a minimum of impedance in order to prevent loss of pressure vibrations from the ink cavity 54.
C. The drive crystal 48 is located at a maximum of impedance in order to achieve efficient electromechanical coupling.

These design criteria, together with the impedance criteria, form a highly desirable basis for the vibratory elements of the acoustic droplet generator.

It is evident from a comparison of FIGS. 2 and 3 that the correspondingly marked dotted vertical lines appearing in the two Figures and identified by the letters A, B, C, D, E, F, G, and H coincide with one another and represent similar cross sections of the two Figures. These sections may be identified and described as follows: (1) the nozzle section identified at A which includes the small orifice 68 and a cone or similarly shaped section 69 disposed within the nozzle and leading up to the orifice, as shown in FIG. 4; (2) the cavity section extending from A to B which includes the ink-filled cavity 54; (3) the thin rectangularly shaped inlet passage 66 identified at B which delivers ink to the cavity 54, such passage lying in a plane that coincides with a standing wave of minimum amplitude thus preventing a loss in pressure vibrations therethrough; (4) the diaphragm section extending from B to C which comprises the tuned vibrating diaphragm supported by the plate 51; and (5) the acoustic vibrator section extending from C to H which includes the exponentially tapered horn 50' illustrated between C and D, the matching cylindrical section 50'' illustrated between D and E, the piezoelectric crystal 48 shown between E and F, the matching section 44'' of the horn 44 shown between F and G, and the rear exponentially tapered horn 44' illustrated between G and H.

Figure 6:
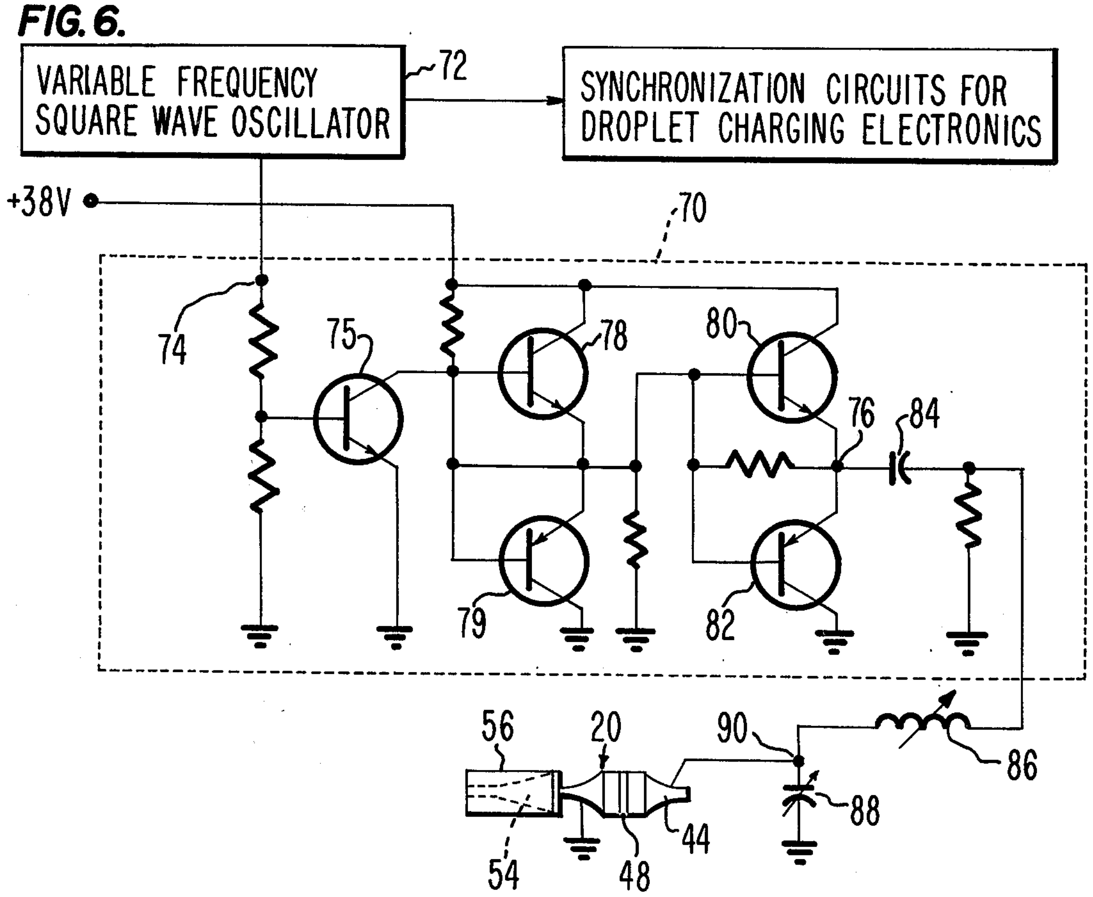
FIG. 6 illustrates a desirable electrical driving circuit for the droplet generator of FIG. 2.

A desirable electrical driving circuit for the inventive ink droplet generator is illustrated in FIG. 6 within the block formed by the dotted outline 70. A variable frequency square wave oscillator 72 is indicated externally of the driving circuit 70 for controlling the latter's frequency. The square wave oscillator is composed of conventional standardized integrated circuit devices including a provision for adjusting the frequency of the oscillator in order to find the optimum operating frequency within the design tolerances. The output of the square wave oscillator or generator 72 is applied at point 74 which serves as the input to the drive circuit. Such output consists of positive-going pulses whose spacing is equal to the operating frequency of the droplet generator. The width of the pulses is equal to one half of the period of repetition with the result that the potential at input point 74 alternates. During half of the cycle the point 74 is at a constant positive potential, for example +5 volts, while during the second half of each cycle the point is at ground potential. The current drawn from the square wave oscillator during the positive portion of the cycle is generally quite small, by way of example, less than 1 milliampere. The transistor 75 generates sufficient current to drive the pair of transistors 78 and 79. In response to the square wave output from transistors 78 and 79, the transistors 80 and 82 alternately switch between conducting and non-conducting states. Consequently, junction point 76 may be considered as alternating between the power supply voltage +38 volts and ground potential. The potential at point 76 in FIG. 6, which serves as the output of the drive circuit, alternates in the same time sequence as the potential at point 74. The electrical current flowing from the output point 76 to and from the capacitor 84 can now be quite large, of the order of hundreds of milliamperes if necessary.

The variable inductor 86, the variable capacitor 88 and the piezoelectric ceramic transducer 48 together form a series-connected resonant circuit. Current flow through the capacitor 84 drives the inductor-capacitor-piezoelectric crystal circuit into electrical resonance. Capacitor 88 is provided to increase the resonant circuit quality factor, or Q, and thereby to increase the driving voltage and current at the piezoelectric crystal. The rapid switching speed of transistors 80 and 82 together with their large current capacity enables large sinusoidal voltages to be generated at point 90 (connected electrically by terminal 46 to the rear horn 44 shown in FIG. 1). Although the drive voltage at output point 76 is a square wave voltage waveform, the current passing through the blocking capacitor 84 is approximately sinusoidal in shape and has a frequency of the square wave repetition rate. The large sinusoidal current and voltages at point 90 provide electrical power for the piezoelectric ceramic transducer 48.

This electrical power is converted as previously described into pressure oscillations in the ink chamber 54 in the region of the nozzle 22. At a given distance beyond the orifice the capillary jet stream 24 breaks into a regular series of ink droplets 26 of uniform size and spacing as previously mentioned. The distance from the orifice at which the break away takes place depends in a monotonic fashion upon the electrical power fed into the piezoelectric transducer. The distance to the break away point should be held essentially constant for proper operation of the droplet generator as a part of a printing device. The circuit, therefore, functions as a very stable and uniform source of electric power for the droplet generator.

FIG. 7 illustrates in enlarged degree a preferred volumetric shape for the ink inlet passage 66 to the cavity 54. It is a rectangularly shaped passage wherein the length of the passage in flow direction is substantially greater than the width of the passage, and the width is substantially greater than the height of the passage. The arrows at the bottom end of the passage 66 in FIG. 7 indicate the direction of the pressure applied to the liquid ink at the entrance to the passage. As earlier mentioned herein the height of the passage is formed by cutting away a portion of a thin seal interposed between the diaphragm 52 and the adjacent wall of the block 54. The cutaway portion would be approximately proportional to the dimensions illustrated in FIG. 7, it being understood that the dimensions of the passage 66 are greatly exaggerated in FIGS. 2 and 7.

While the form of the invention herein disclosed constitutes a presently preferred embodiment, many others are possible. It is not intended herein to mention all of the possible equivalent forms or ramifications of the invention. It is to be understood that the terms used herein are merely descriptive rather than limiting, and that various changes may be made without departing from the spirit and scope of the invention.

What is claimed is:

1. The method of recording on a record member by use of liquid ink droplets which includes the steps of supplying ink to the wider end of a tapered cavity having a discharge orifice in the apex end thereof under such pressure that a jet stream is projected from the discharge orifice toward the record member, superimposing a cyclically varying pressure energy upon the liquid ink content of the cavity to cause the jet stream issuing from the discharge orifice to break up into a succession of separately spaced apart ink droplets which move in free flight toward the record member, and applying said pressure energy at such a frequency as to cause the establishment in the liquid ink content of the cavity of a standing wave pattern of pressure nodes and antinodes and such that one such pressure node is located at the wider ink supplying end of the cavity and one such pressure antinode is located at the discharge orifice.

2. A liquid jet droplet generator system comprising:

a body having a generally conically shaped liquid containing cavity opening out of one side of the body at its apex end to form a jet stream discharge outlet port and having its opposite wider end closed by a wall formed of material favoring supersonic wave transmission;

a resonant vibrating unit including a cone-shaped solid horn formed of material favoring supersonic wave transmission and having its apex end engaging said wider end of the cavity and further including a piezoelectric type member capable of converting pulsating electrical voltages into ultrasonic mechanical pressure vibrations which is effectively engaged with the opposite wider end of the horn;

means for supplying the cavity with liquid through an inlet port under such pressure as to maintain the cavity full of such liquid as portions of the same liquid are discharged from the orifice in an unbroken stream; and means for subjecting the piezoelectric type member of the vibrating unit to a high frequency electric source whereby, upon activation of the piezoelectric type member from said electric source, a standing wave pressure pattern is set up in the liquid contained in the cavity which causes the jet stream issuing from the discharge orifice to break up into liquid droplets a short distance therefrom, and establishing a standing wave pattern having pressure nodes and antinodes separated from one another in the cavity from one end to the other end thereof and such that one of the standing waves of said pattern is located at one of said ports.

3. A liquid jet droplet generator system comprising:

a body having a generally conically shaped liquid containing cavity opening out of one side of the body at its apex end to form a jet stream discharge orifice and having its opposite wider end closed by a wall formed of material favoring supersonic wave transmission;

a resonant vibrating unit including a cone-shaped solid horn formed of material favoring supersonic wave transmission and having its apex and engaging said wall at the wider end of the cavity and further including a piezoelectric type member capable of converting pulsating electrical voltages into ultrasonic mechanical pressure vibrations which is effectively engaged with the opposite wider end of the horn;

means for supplying the cavity with liquid under such pressure as to maintain the cavity full of such liquid as portions of the same liquid are discharged from the orifice in an unbroken stream, said last means including a liquid inlet to the cavity; and means for subjecting the piezoelectric type member of the vibrating unit to a high frequency electric source whereby, upon activation of the piezoelectric type member at a given frequency from said electric source, a standing wave pressure pattern is set up in the liquid contained in the cavity which causes the jet stream issuing from the discharge orifice to break up into liquid droplets a short distance therefrom, said standing wave pressure pattern having pressure nodes and antinodes separated from one another in the cavity from one end to the other end thereof and such that one of the pressure antinodes is located at the discharge orifice.

4. A liquid jet droplet generator system comprising:

a body having a generally conically shaped liquid containing cavity opening out of one side of the body at its apex end to form a jet stream discharge orifice and having its opposite wider end closed by a wall formed of material favoring supersonic wave transmission;

a resonant vibrating unit including a cone-shaped solid horn formed of material favoring supersonic wave transmission and having its apex end engaging said wall at the wider end of the cavity and further including a piezoelectric type member capable of converting pulsating electrical voltages into ultrasonic mechanical pressure vibrations which is effectively engaged with the opposite wider end of the horn;

means for supplying the cavity with liquid under such pressure as to maintain the cavity full of such liquid as portions of the same liquid are discharged from the orifice in an unbroken stream, said last means including a liquid delivery inlet located adjacent to the wider end of the cavity; and means for subjecting the piezoelectric type member of the vibrating unit to a high frequency electric source whereby, upon activation of the piezoelectric type member at a given frequency from said electric source, a standing wave pressure pattern is set up in the liquid contained in the cavity which causes the jet stream issuing from the discharge orifice to break up into liquid droplets a short distance therefrom, said standing wave pressure pattern having pressure nodes and antinodes separated from one another in the cavity from one end to the other end thereof and such that one of the pressure antinodes is located at the discharge orifice and that one of the pressure nodes is located at the liquid delivery inlet.

5. The droplet generator system as set forth in claim 4 wherein the standing wave pattern established by the resonant vibrating unit also extends to the cone-shaped horn and the piezoelectric type member and such that one of the pressure antinodes is located within the piezoelectric type member.

6. A liquid jet droplet generator system comprising:

a body having a generally conically shaped liquid containing cavity opening out of one side of the body at its apex end to form a jet stream discharge orifice and having its opposite wider end closed by a wall formed of material favoring supersonic wave transmission;

a resonant vibrating unit including a cone-shaped solid horn formed of material favoring supersonic wave transmission and having its apex end engaging said wall at the wider end of the cavity and further including a piezoelectric type member capable of converting pulsating electrical voltages into ultrasonic mechanical pressure vibrations which is effectively engaged with the opposite wider end of the horn;

means for supplying the cavity with liquid under such pressure as to maintain the cavity full of such liquid as portions of the same liquid are discharged from the orifice in an unbroken stream, said last means including a liquid inlet to the cavity; and means for subjecting the piezoelectric type member of the vibrating unit to a high frequency electric source whereby, upon activation of the piezoelectric type member at a given frequency from said electric source, a standing wave pressure pattern is set up in the liquid contained in the cavity which causes the jet stream issuing from the discharge orifice to break up into liquid droplets a short distance therefrom, said standing wave pressure pattern having pressure nodes and antinodes separated from one another in the cavity from one end to the other end thereof and such that one of the pressure nodes is located at the inlet of the cavity.

7. The droplet generator system as set forth in claim 6 wherein the liquid supplying means includes a liquid inlet into the cavity, and wherein the resonant vibrating unit establishes a standing wave pattern having pressure nodes and antinodes separated from one another in the cavity from one end to the other end thereof and such that one of the pressure nodes is located at the inlet of the cavity.

8. The droplet generator system as set forth in claim 6 wherein the inlet to the cavity is a thin rectangularly shaped passage having the plane of the passage coincident with said one of the pressure nodes.

9. Apparatus for efficiently transmitting pressure variations from a piezoelectric type element to a substantially confined body of liquid, comprising:

a solid body formed internally with a conically-shaped rigid-walled cavity having a capillary size discharge orifice in the apex end thereof and further having a laterally extending inlet thereinto remote from the discharge orifice for supplying liquid to the cavity, a resonant system associated with the cavity including axially aligned solid front and rear horns and a piezoelectric type element interposed therebetween and electromechanically coupled thereto, said front and rear horns each being similarly shaped to provide a cylindrical section to which the piezoelectric element is coupled and an exponentially tapered section on the side of the cylindrical section leading away from the piezoelectric element, and a diaphragm wall sealingly closing the wider end of the cavity and being attached to the reduced end of the tapered section of the front horn and such that the respective axes of the cavity and the horns are coincident, said horns, diaphragm wall and cavity being acoustically matched with one another.

10. The apparatus set forth in Claim 9 wherein a series connected resonating electric circuit is connected to the rear horn for supplying electrical current pulses for activating the piezoelectric type element and includes an inductor in series relation with the piezoelectric element, a grounded capacitor in parallel relation with the piezoelectric element, and a variable D.C. power supply voltage whose variation will adjust the amplitude of the current pulses delivered to the piezoelectric element for activating the same.

11. The apparatus as set forth in claim 9 wherein means is provided for activating the piezoelectric type element from a high frequency electric source at such a frequency as to set up in the resonant system a standing wave pressure pattern having pressure nodes and antinodes separated from one another from one end to the other end thereof and such that one of the pressure nodes is located at the liquid supply inlet to the cavity.

12. The apparatus as set forth in claim 11 wherein the pressure of the liquid supplied to the cavity and maintained therein ranges from approximately 200 to approximately 400 lbs/in$^2$.

13. The apparatus as set forth in claim 9 wherein means is provided for activating the piezoelectric type element from a high frequency electric source at such a frequency as to set up in the resonant system a standing wave pressure pattern having pressure nodes and antinodes separated from one another from one end to the other end thereof and such that one of the pressure antinodes is located at the discharge orifice of the cavity.

14. The apparatus as set forth in claim 13 wherein the pressure of the liquid supplied to the cavity and maintained therein ranges from approximately 200 to approximately 400 lbs/in$^2$.

15. The apparatus as set forth in claim 9 wherein means is provided for activating the piezoelectric type element from a high frequency electric source at such a frequency as to set up in the resonant system a standing wave pressure pattern having pressure nodes and antinodes separated from one another from one end to the other end thereof and such that one of the pressure nodes is located at the liquid supply inlet to the cavity and that one of the pressure antinodes is located at the discharge orifice of the cavity.

16. The apparatus as set forth in claim 15 wherein the pressure of the liquid supplied to the cavity and maintained therein ranges from approximately 200 to approximately 400 lbs/in$^2$.

* * * * *